US011183340B2

(12) United States Patent
Kawamoto et al.

(10) Patent No.: US 11,183,340 B2
(45) Date of Patent: Nov. 23, 2021

(54) METHOD FOR MANUFACTURING SOLID ELECTROLYTIC CAPACITOR

(71) Applicant: SHOWA DENKO K.K., Tokyo (JP)

(72) Inventors: Takeshi Kawamoto, Tokyo (JP); Yuka Niimi, Tokyo (JP); Toshiya Kawasaki, Tokyo (JP); Yoshinori Shibuya, Tokyo (JP); Takeshi Kohama, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 104 days.

(21) Appl. No.: 16/472,980

(22) PCT Filed: Sep. 29, 2017

(86) PCT No.: PCT/JP2017/035431
§ 371 (c)(1),
(2) Date: Jun. 24, 2019

(87) PCT Pub. No.: WO2018/123179
PCT Pub. Date: Jul. 5, 2018

(65) Prior Publication Data
US 2020/0090874 A1  Mar. 19, 2020

(30) Foreign Application Priority Data
Dec. 28, 2016  (JP) .............................. JP2016-254979

(51) Int. Cl.
*H01G 9/00* (2006.01)
*C08G 61/12* (2006.01)
*H01G 9/028* (2006.01)
*H01G 9/048* (2006.01)
*H01G 9/15* (2006.01)

(52) U.S. Cl.
CPC ......... *H01G 9/0036* (2013.01); *C08G 61/126* (2013.01); *H01G 9/0032* (2013.01); *H01G 9/028* (2013.01); *H01G 9/048* (2013.01); *H01G 9/15* (2013.01); *C08G 2261/3243* (2013.01)

(58) Field of Classification Search
CPC ........ H01G 9/15; H01G 9/028; H01G 9/0032; H01G 9/0036; H01G 9/048
See application file for complete search history.

(56) References Cited

U.S. PATENT DOCUMENTS

| 6,466,421 | B1 | 10/2002 | Monden et al. |
| 6,614,063 | B2 | 9/2003 | Hayashi et al. |
| 9,183,990 | B2 | 11/2015 | Nobuta et al. |
| 2002/0034060 | A1* | 3/2002 | Konuma .................. H01G 9/15 361/326 |
| 2014/0063691 | A1 | 3/2014 | Kosuge et al. |

FOREIGN PATENT DOCUMENTS

| JP | 05-255486 A | 10/1993 |
| JP | 2000-012394 A | 1/2000 |
| JP | 2001-006983 A | 1/2001 |
| JP | 2002-158144 A | 5/2002 |
| JP | 2003-100561 A | 4/2003 |
| JP | 3541429 B2 | 7/2004 |
| JP | 2005-109252 A | 4/2005 |
| JP | 2010-195980 | * 9/2010 |
| JP | 2010-195980 A | 9/2010 |

OTHER PUBLICATIONS

Communication dated Aug. 26, 2020, from the European Patent Office in corresponding European Application No. 17887591.0.
International Search Report for PCT/JP2017/035431 dated Dec. 19, 2017 [PCT/ISA/210].

* cited by examiner

*Primary Examiner* — Austin Murata
(74) *Attorney, Agent, or Firm* — Sughrue Mion, PLLC

(57) ABSTRACT

A method of producing a solid electrolytic capacitor, including a step of forming a dielectric film on the surface of a valve-acting metal having fine pores and a step of forming a solid electrolyte layer containing a conductive polymer on the dielectric film; wherein the solid electrolyte layer containing the conductive polymer is formed without using an oxidizing agent by: (i) a method of polymerizing at least one of the compounds (A1) represented by formula (1) disclosed herein in the presence of a compound (B) having a sulfo group; (ii) a method of copolymerizing at least one compound (A2) represented by formula (2) disclosed herein; and (iii) a method of polymerizing at least one of the compounds (A1) and (A2).

10 Claims, No Drawings

METHOD FOR MANUFACTURING SOLID ELECTROLYTIC CAPACITOR

CROSS REFERENCE TO RELATED APPLICATIONS

This application is a National Stage of International Application No. PCT/JP2017/035431 filed Sep. 29, 2017, claiming priority based on Japanese Patent Application No. 2016-254979 filed Dec. 28, 2016.

TECHNICAL FIELD

The present invention relates to a method for producing a solid electrolytic capacitor by forming a solid electrolyte layer containing an electrically conductive polymer on the surface of valve-acting metal having fine pores.

BACKGROUND ART

A solid electrolytic capacitor has a structure in which a dielectric oxide film is formed on the surface of valve-acting metal (anode body) by anode oxidation and on top of that, an electron conductive solid electrolyte as a cathode material is formed. The solid electrolytic capacitor is excellent in high-frequency characteristics and in stability in a high-temperature environment due to its low equivalent series resistance (ESR).

As an example of valve-acting metal used as an anode body, aluminum, tantalum, niobium or the like is known.

As a solid electrolyte layer, electroconductive polymer materials obtained by doping an electron-accepting compound as a dopant to a H-conjugated polymer typified by polyacetylene, polythiophene, polyaniline, polypyrrole, polyphenylene, and poly(p-phenylene-vinylene) have been developed, and applications to an antistatic agent, a solid electrolyte for a capacitor, an electro conductive coating, an electrochromic device, an electrode material, a thermoelectric conversion material, a transparent conductive film, a chemical sensor, an actuator and the like have been considered. Among the above-described H-conjugated polymers, polythiophene is useful from the viewpoint of chemical stability.

Generally, as a method for forming a solid electrolyte layer in a solid electrolytic capacitor, the following methods are known: i.e. a method of conducting chemical polymerization by impregnating fine pores with a monomer solution of a conductive polymer and an oxidizing agent solution, a method of forming a solid electrolyte layer by impregnating fine pores with a water dispersion of a conductive polymer, or the like.

For example, JP 2003-100561 A (Patent Document 1) discloses a production method comprising a step of forming a capacitor element by winding an anode foil on which a dielectric oxide film layer is formed and a cathode foil subjected to etching or etching and subsequent chemical conversion coating via a separator, forming a first solid electrolytic layer by impregnating the capacitor element with a conductive polymer dispersed aqueous solution, in which fine particles of the conductive polymer are dispersed, and a step of forming a second solid electrolytic layer by impregnating the surface of the first solid electrolyte layer with a solution containing a heterocyclic monomer and a solution containing an oxidizing agent separately or a mixed solution containing the heterocyclic monomer and the oxidizing agent. By this method, a solid electrolytic capacitor having a low internal resistance (ESR), a high capacity achievement rate and superior high-frequency characteristics.

JP 2005-109252 A (Patent Document 2) discloses a method of forming a conductive polymer layer as a solid electrolyte layer by chemical polymerization of polymerizable monomers on a capacitor element comprising a sintered body, which is obtained by sintering a valve-acting metal powder, having a dielectric oxide film formed on the surface thereof; and immersing the capacitor element in a conductive polymer solution or applying the conductive polymer solution on the capacitor element followed by drying, to thereby form a conductive polymer layer even thicker on the conductive polymer layer formed by chemical polymerization. By this method, it is possible to form a conductive polymer layer even thicker on the outer circumference of the capacitor element. In particular, it is possible to form a sufficiently thick conductive polymer layer even on the portions such as apexes of the capacitor element, in which a sufficiently thick conductive polymer layer was not able to be formed by the chemical polymerization step. For this reason, it is possible to prevent the generation of short circuits and increase in leakage current in the portions where the capacitor element has a thin conductive polymer layer formed thereon.

In JP 2002-158144 A (U.S. Pat. No. 6,614,063; Patent Document 3), to solve a problem of performance decrease (deterioration of ESR) due to a residue generated at the time of forming a solid electrolyte layer of conductive polymer layer by chemical polymerization of polymerizable monomers, a method of removing the residue by washing the formed polymerized film with a shower followed by drying is disclosed.

PRIOR ART DOCUMENTS

Patent Documents

Patent Document 1: JP 2003-100561 A
Patent Document 2: JP 2005-109252 A
Patent Document 3: JP 2002-158144 A (U.S. Pat. No. 6,614,063)

DISCLOSURE OF THE INVENTION

Problems to be Solved by the Invention

In the above-described conventional technologies, it is necessary to employ a cumbersome polymerization step or film-formation step of a conductive polymer, or further a purification step in order to obtain a solid electrolytic capacitor having excellent properties, particularly such as a low ESR, a high capacity achievement rate, and low leakage current characteristics. In addition, due to use of a metal compound as an oxidizing agent of polymerization reaction of the conductive polymer, metal impurities derived from the oxidizing agent remain after the polymerization and causes damage to a dielectric coating film, leading to a problem of increase in leakage current.

An objective of the present invention is to provide a production method for forming a solid electrolyte film containing a conductive polymer by simple steps without employing a cumbersome polymerization step, film-formation step, or a purification step to obtain a solid electrolytic capacitor having excellent properties, particularly such as a low ESR, a high capacity achievement rate, and superior low leakage current characteristics.

Means to Solve Problem

As a result of intensive study to solve the above-described problem, the present inventors have found that the targeted conductive polymer can be obtained by conducting homopolymerization or copolymerization using a single or plurality of compounds having a benzo[c]thiophene-1,3-dihydro-2-oxide skeleton as being an isothianaphthene derivative in the presence of a compound having a sulfo group serving as a substituent having a dopant ability and a catalytic ability, and have accomplished the method of producing a solid electrolytic capacitor of the present invention.

The present invention relates to a method of producing a solid electrolytic capacitor as described in the following [1] to [12]. [1] A method of producing a solid electrolytic capacitor comprising a step of preparing valve-acting metal having fine pores, a step of forming a dielectric film on the surface of the valve-acting metal, a step of attaching a polymerization reaction solution containing monomers of a conductive polymer on the dielectric film, and a step of polymerizing the monomers of the conductive polymer to thereby form a solid electrolyte layer containing the conductive polymer on the dielectric film; wherein the solid electrolyte layer containing the conductive polymer is formed on the dielectric film by polymerizing at least one compound (A1) represented by the following formula (1) without using an oxidizing agent in the presence of a compound (B) having a sulfo group

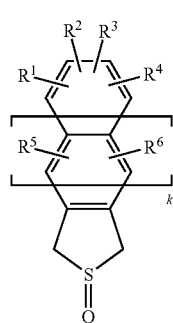

(1)

in the formula, $R^1$, $R^2$, $R^3$, $R^4$, $R^5$, and $R^6$ independently represent a monovalent substituent selected from a group consisting of (1) a hydrogen atom, (2) linear or branched alkyl group having 1 to 20 carbon atoms, linear or branched alkoxy group having 1 to 20 carbon atoms, or linear or branched alkyl ester group (alkylcarbonyloxy group or alkoxycarbonyl group) having 1 to 20 carbon atoms, (3) $SO_2M$, (4) a halogen atom, (5) carboxy group, (6) phosphonyl group, (7) nitro group, (8) cyano group, (9) primary, secondary or tertiary amino group, (10) trihalomethyl group, (11) phenyl group, and (12) phenyl group substituted with at least one member selected from alkyl group, hydroxy group, alkoxy group, alkyl ester group, carbonyl group and a halogen atom. Hydrocarbon chains in the substituent represented by $R^1$, $R^2$, $R^3$, $R^4$, $R^5$, and $R^6$ are bound to one another at an arbitrary position and may form at least one bivalent chain that forms at least one three- to seven-membered ring structure of saturated or unsaturated hydrocarbon chain with the carbon atoms to which the substituent is bound. The alkyl group, alkoxy group, or alkyl ester group represented by $R^1$, $R^2$, $R^3$, $R^4$, $R^5$, and $R^6$, or a cyclic hydrocarbon chain constituted thereof may contain at least one bond selected from a carbonyl bond, an ether bond, an ester bond, an amide bond, a sulfide bond, a sulfinyl bond, sulphonyl bond, and an imino bond. M represents OH; alkali metal alkoxide selected from $O^-Na^+$, $O^-Li^+$, and $O^-K^+$; ammonium alkoxide represented by $O^-NH_4+$; linear or branched alkoxy group having 1 to 20 carbon atoms; or a halogen atom selected from chlorine, fluorine, bromine, and iodine, k represents the number of condensed rings surrounded by a hetero ring and a benzene ring having substituents of $R^1$ to $R^4$, which is an integer from 0 to 3.

[2] The method of producing a solid electrolytic capacitor according to [1] above, wherein the compound (A1) is a compound in which k in the formula (1) is 0.

[3] The method of producing the solid electrolytic capacitor according to [1] or [2] above, wherein $R^1$, $R^2$, $R^3$, $R^4$, $R^5$, and $R^6$ in the formula (1) independently is a monovalent substituent selected from (1) a hydrogen atom, (2) linear or branched alkyl group having 1 to 20 carbon atoms, linear or branched alkoxy group having 1 to 20 carbon atoms, or linear or branched alkyl ester group having 1 to 20 carbon atoms, and (3) a halogen atom.

[4] A method of producing a solid electrolytic capacitor, comprising a step of preparing valve-acting metal having fine pores, a step of forming a dielectric film on the surface of the valve-acting metal, a step of attaching a polymerization reaction solution containing monomers of a conductive polymer on the dielectric film, and a step of polymerizing the monomers of the conductive polymer to thereby form a solid electrolyte layer containing the conductive polymer on the dielectric film; wherein the solid electrolyte layer containing the conductive polymer is formed on the dielectric film by polymerizing at least one compound (A2) represented by formula (2) without using an oxidizing agent

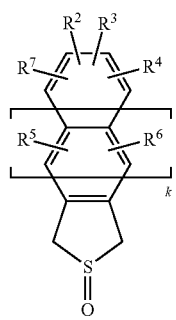

(2)

in the formula, $R^7$ is sulfo group. $R^2$, $R^3$, $R^4$, $R^5$, and $R^6$ independently represent a monovalent substituent selected from a group consisting of (1) a hydrogen atom, (2) linear or branched alkyl group having 1 to 20 carbon atoms, linear or branched alkoxy group having 1 to 20 carbon atoms, or linear or branched alkyl ester group (alkylcarbonyloxy group or alkoxycarbonyl group) having 1 to 20 carbon atoms, (3) $SO_2M$, (4) a halogen atom, (5) carboxy group, (6) phosphonyl group, (7) nitro group, (8) cyano group, (9) primary, secondary or tertiary amino group, (10) trihalomethyl group, (11) phenyl group, and (12) phenyl group substituted with at least one member selected from alkyl group, hydroxy group, alkoxy group, alkyl ester group, carbonyl group, sulfo group and a halogen atom. Hydrocarbon chains in the substituent represented by $R^2$, $R^3$, $R^4$, $R^5$, and $R^6$ are bound to one another at an arbitrary position and may form at least one bivalent chain that forms at least one three- to seven-membered ring structure of saturated or unsaturated hydrocarbon chain with the carbon atoms to which the substituent is bound. The alkyl group, alkoxy group, or alkyl ester group represented by $R^2$, $R^3$, $R^4$, $R^5$, and $R^6$, or a cyclic hydrocarbon chain constituted thereof may contain at least one bond selected from a carbonyl bond, an ether bond, an ester bond, an amide bond, a sulfide bond, a sulfinyl bond, sulphonyl bond, and an imino bond. M represents OH; alkali metal alkoxide selected from $O^-Na^+$, $O^-Li^+$, and $O^-K^+$; ammonium alkoxide represented by $O^-NH_4^+$; linear or branched alkoxy group having 1 to 20 carbon atoms; or a halogen atom selected from chlorine, fluorine, bromine, and iodine. k represents the number of condensed rings surrounded by a hetero ring and a benzene ring having substituents of $R^2$ to $R^4$, which is an integer from 0 to 3.

[5] The method of producing the solid electrolytic capacitor according to [4] above, wherein the compound (A2) is a compound in which k in the formula (2) is 0.

[6] The method of producing the solid electrolytic capacitor according to [4] or [5] above, wherein the compound (A2) is a compound in which $R^2$, $R^3$, $R^4$, $R^5$, and $R^6$ in the formula (2) independently is a monovalent substituent selected from (1) a hydrogen atom, (2) linear or branched alkyl group having 1 to 20 carbon atoms, linear or branched alkoxy group having 1 to 20 carbon atoms, or linear or branched alkyl ester group having 1 to 20 carbon atoms, and (3) a halogen atom.

[7] A method of producing a solid electrolytic capacitor, comprising a step of preparing valve-acting metal having fine pores, a step of forming a dielectric film on the surface of the valve-acting metal, a step of attaching a polymerization reaction solution containing monomers of a conductive polymer on the dielectric film, and a step of polymerizing the monomers of the conductive polymer to thereby form a solid electrolyte layer containing the conductive polymer on the dielectric film; wherein the solid electrolyte layer containing the conductive polymer is formed on the dielectric film by copolymerizing at least one of compounds (A1) represented by the formula (1) in [1] above and at least one of compounds (A2) represented by the formula (2) in [4] above without using an oxidizing agent.

[8] A method of producing a solid electrolytic capacitor, comprising a step of preparing valve-acting metal having fine pores, a step of forming a dielectric film on the surface of the valve-acting metal, a step of attaching a polymerization reaction solution containing monomers of the conductive polymer on the dielectric film, and a step of polymerizing the monomers of a conductive polymer to thereby form a solid electrolyte layer containing the conductive polymer on the dielectric film; wherein the solid electrolyte layer containing the conductive polymer is formed on the dielectric film by copolymerizing at least one of the compounds (A1) represented by the formula (1) in [1] above with compound (D), which can be copolymerized with the compound (A1) in the presence of a compound (B) having sulfo group without using an oxidizing agent.

[9] A method of producing a solid electrolytic capacitor, comprising a step of preparing valve-acting metal having fine pores, a step of forming a dielectric film on the surface of the valve-acting metal, a step of attaching a polymerization reaction solution containing monomers of a conductive polymer on the dielectric film, and a step of polymerizing the monomers of the conductive polymer to thereby form a solid electrolyte layer containing the conductive polymer on the dielectric film; wherein the solid electrolyte layer containing the conductive polymer is formed on the dielectric film by copolymerizing at least one compound (A2) represented by the formula (2) in [4] above with compound (D), which can be copolymerized with the compound (A2), without using an oxidizing agent.

[10] A method of producing a solid electrolytic capacitor, comprising a step of preparing valve-acting metal having fine pores, a step of forming a dielectric film on the surface of the valve-acting metal, a step of attaching a polymerization reaction solution containing monomers of a conductive polymer on the dielectric film, and a step of polymerizing the monomers of the conductive polymer to thereby form a solid electrolyte layer containing the conductive polymer on the dielectric film; wherein the solid electrolyte layer containing the conductive polymer is formed on the dielectric film by copolymerizing at least one of the compounds (A1) represented by the formula (1) in [1] above, at least one of the compounds (A2) represented by the formula (2) in [4] above, and compound (D), which can be copolymerized with the compound (A1) and the compound (A2).

[11] The method of producing a solid electrolytic capacitor according to any one of [1] to [10] above, wherein the polymerization is performed while removing the generated water.

[12] The method of producing a solid electrolytic capacitor according to any one of [1] to [10] above, wherein a solvent having a boiling point higher than water is used.

Effects of Invention

According to the present invention,
(1) it is possible to form a solid electrolyte film containing a conductive polymer on the dielectric film on the surface of valve-acting metal having fine pores by simple steps without employing a cumbersome polymerization step, film-formation step, or a purification step;
(2) it is possible to provide a solid electrolytic capacitor having a low ESR, a high capacity achievement rate, and excellent low leakage current characteristics.

MODE FOR CARRYING OUT INVENTION

Hereinafter, the present invention is described in more detail.

The method of producing the solid electrolytic capacitor of the present invention comprises a step of preparing valve-acting metal having fine pores as an anode body, a step of forming a dielectric film on the surface of the valve-acting metal having fine pores, a step of attaching a polymerization reaction solution for forming a solid electrolyte layer on the dielectric film, a step of conducting polymerization reaction of the conductive polymer to thereby form a solid electrolyte layer on the dielectric film, and a step of forming a conductive layer on the solid electrolyte layer by using a conductive paste.

[Step of Preparing Valve-Acting Metal Having Fine Pores]

Examples of valve-acting metal to be used as an anode body in the method of producing a solid electrolytic capacitor of the present invention include aluminum (Al), beryllium (Be), bismuth (Bi), magnesium (Mg), germanium (Ge), hafnium (Hf), niobium (Nb), antimony (Sb), silicon (Si), tin (Sn), tantalum (Ta), titanium (Ti), vanadium (V), tungsten (W), zirconium (Zr) and an alloy or a compound of at least one of these metals and another element. Among these, aluminum, niobium, tantalum, silicon and tungsten are preferable, and aluminum, niobium and tantalum are more preferable.

The form of the anode body may be a form of a molded body having fine pores such as a rolled foil subjected to etching, a sintered body of a fine powder, and the like. Hereinafter, in the present description, valve-acting metal having fine pores may be referred to as a porous anode body.

[Step of Forming Dielectric Film]

A dielectric film composed of an oxide is formed on the outer surface and inside fine pores of the porous anode body. A dielectric film can be formed by anode oxidation of the surface (including inside surface of fine pores) of the porous anode body.

A porous anode body is subjected to anode oxidation (chemical conversion treatment) by, for example, applying voltage to the anode body in a phosphoric acid solution, and it is possible to form a dielectric film on the surface (including inside surface of fine pores) of the porous anode body.

The conversion voltage can be determined depending on the thickness of the dielectric film and the withstanding voltage of the capacitor. The conversion voltage is preferably 1 to 800 V, more preferably 10 to 300 V, still more preferably 1 to 100 V. It is desirable to conduct the chemical conversion treatment at a voltage within the above-mentioned range from the viewpoint of the thickness of the chemical conversion layer and the withstanding voltage.

[Step of Attaching Polymerization Reaction Solution on the Dielectric Film]

On the dielectric layer formed on the surface of the porous anode body, a solid electrolyte layer containing a conductive polymer is further formed. For this, a polymerization reaction solution for forming a solid electrolyte layer (reaction solution for polymerizing monomers of the conductive polymer) is attached on the dielectric film on the surface of the porous anode body.

Examples of the methods for attaching the polymerization reaction solution include a known method such as applying, spraying and immersing. Among these, a method of immersing is preferable from the standpoint that the reaction solution can be attached on and penetrate in the porous anode body uniformly and evenly.

The immersing time in the reaction solution is generally around 1 second to around 10 minutes, preferably 1 second to 5 minutes, more preferably 1 second to 3 minutes. By immersing the anode body in the reaction solution within the above-mentioned time range, the reaction solution penetrates evenly and sufficiently in fine pores of the porous anode body. The solution temperature may vary depending on the kind of the solution but is generally 0 to 50° C., preferably 5 to 40° C., more preferably 10 to 35° C. By immersing the anode body in the reaction solution within the above-mentioned temperature range, the reaction solution penetrates evenly and sufficiently in fine pores of the porous anode body.

[Step of Forming Solid Electrolyte Layer]

A solid electrolyte layer containing a conductive polymer is formed on the dielectric layer by polymerizing monomers of a conductive polymer while removing a part or the entirety of the solvent from the polymerization reaction solution attached on the porous anode body obtained in the above-mentioned step.

It is desirable to remove the solvent by a heat treatment method from the viewpoint of efficiency, preferably under the conditions that avoid deterioration of the conductive polymer due to oxygen. The heating conditions can be determined depending on the boiling point and the volatility of the solvent.

The method for forming a solid electrolyte layer containing a conductive polymer in the method for producing a solid electrolytic capacitor of the present invention is either of the methods (i) to (iii) given below.

(i) At least one of the compounds (A1) represented by formula (1) is polymerized in the presence of compound (B) having sulfo group without using an oxidizing agent.

(ii) At least one of the compounds (A2) represented by formula (2) is polymerized without using an oxidizing agent.

(iii) At least one of the compounds (A1) represented by formula (1) and least one of the compounds (A2) represented by formula (2) at are copolymerized without using an oxidizing agent.

<Method (i)>

A solid electrolytic capacitor can be manufactured by polymerizing at least one of the compounds (A1) represented by formula (1) is polymerized on the surface of valve-acting metal having fine pores in the presence of compound (B) having sulfo group without using an oxidizing agent to thereby form a solid electrolyte layer.

[Compound (A1)]

The compound (A1) used in the present invention is a compound represented by the formula (1).

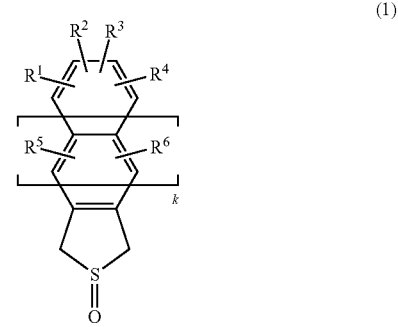

In the formula (1), $R^1$, $R^2$, $R^3$, $R^4$, $R^5$, and $R^6$ independently represent a monovalent substituent selected from a group consisting of (1) a hydrogen atom, (2) linear or branched alkyl group having 1 to 20 carbon atoms, linear or branched alkoxy group having 1 to 20 carbon atoms, or linear or branched alkyl ester group (alkylcarbonyloxy group or alkoxycarbonyl group) having 1 to 20 carbon atoms, (3) $SO_2M$, (4) a halogen atom, (5) carboxy group, (6) phosphonyl group, (7) nitro group, (8) cyano group, (9) primary, secondary or tertiary amino group, (10) trihalomethyl group, (11) phenyl group, and (12) phenyl group substituted with at least one member selected from alkyl group, hydroxy group, alkoxy group, alkyl ester group, carbonyl group and a halogen atom. M represents OH; alkali metal alkoxide selected from $O^-Na^+$, $O^-Li^+$, and $O^-K^+$; ammonium alkoxide represented by $O^-NH_4^+$; linear or branched alkoxy group having 1 to 20 carbon atoms; or a halogen atom selected from chlorine, fluorine, bromine, and iodine.

Useful examples of the substituents $R^1$, $R^2$, $R^3$, $R^4$, $R^5$, and $R^6$ include a hydrogen atom, a halogen atom, $SO_2M$, alkyl group, alkoxy group, alkyl ester group, nitro group and cyano group.

When these substituents are exemplified in more detail, examples of a halogen atom include fluorine, chlorine, bromine and iodine, and examples of hydrocarbon chains of alkyl group or alkyl ester group include methyl, ethyl, propyl, isopropyl, n-butyl, isobutyl, t-butyl, pentyl, hexyl, octyl, dodecyl, tetradecyl, cyclopentyl, and cyclohexyl. Examples of the alkoxy group include methoxy group, ethoxy group, (2-methoxy)ethoxy group, propoxy group, isopropoxy group, hexyloxy group, octyloxy group, and dodecyloxy group. Alkyl ester group is specifically alkyl-carbonyloxy group and alkoxycarbonyloxy group, for example, such as malonate ester group (—OCOH$_2$CO$_2$H), fumarate ester group (—OCOCH=CHCO$_2$H; a double bond is trans-form), and maleate ester group (—OCOCH=CHCO$_2$H, a double bond is cis-form). In addition, examples include alkylcarbonyloxy group and alkoxycarbonyloxy group, in which alkyl group is methyl group, ethyl group, n-propyl group, isopropyl group, n-butyl group, isobutyl group, t-butyl group, pentyl group, hexyl group, octyl group, dodecyl group, tetradecyl group, cyclopentyl group, cyclohexyl group and the like.

Furthermore, examples of substituents other than those described above include amino group such as methyl amino group, ethyl amino group, diphenyl amino group and anilino group; trifluoromethyl group, chlorophenyl group, and acetamide group.

$R^5$ and $R^6$ are preferably a hydrogen atom. With respect to $R^1$, $R^2$, $R^3$, and $R^4$, preferably at least two, more preferably three, most preferably all of the four are a hydrogen atom.

Hydrocarbon chains in the substituents represented by $R^1$, $R^2$, $R^3$, $R^4$, $R^5$, and $R^6$ are bound to one another at an arbitrary position and may form at least one bivalent chain that forms at least one three- to seven-membered ring structure of saturated or unsaturated hydrocarbon chain with the carbon atoms to which the substituent is bound.

The alkyl group, alkoxy group, or alkyl ester group represented by $R^1$, $R^2$, $R^3$, $R^4$, $R^5$, and $R^6$, or a cyclic hydrocarbon chain constituted thereof may contain at least one bond selected from a carbonyl bond, an ether bond, an ester bond, an amide bond, a sulfide bond, a sulfinyl bond, sulphonyl bond, and an imino bond.

Examples of three- to seven-membered ring structures of saturated or unsaturated hydrocarbon formed by hydrocarbon chains of $R^1$, $R^2$, $R^3$, $R^4$, $R^5$, or $R^6$ in formula (1) bound to one another at an arbitrary position include the structures represented by the following formulae (3) to (5).

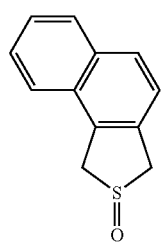

(3)

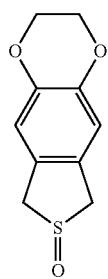

(4)

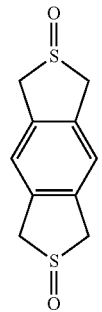

(5)

k represents the number of condensed rings surrounded by a 1,3-dihydrothiophene-S-oxide ring and a benzene ring having substituents of $R^1$ to $R^4$ (formula (1)), which is an integer from 0 to 3. k is preferably 0 from the viewpoint of solubility in a solvent.

Examples of the basic skeletons excluding the substituents $R^1$ to $R^6$ of the compounds represented by formula (1) includes 1,3-dihydroisothianaphthene-S-oxide (a compound in which k is 0).

As a compound represented by formula (1), at least one member selected from benzo[c]thiophene-1,3-dihydro-2-oxide and naphtho[2,3-c]thiophene-1,3-dihydro-2-oxide, which may have a substituent, can be preferably used.

Specific examples include benzo[c]thiophene-1,3-dihydro-2-oxide, benzo[c]thiophene-1,3-dihydro-5-methyl-2-oxide, benzo[c]thiophene-1,3-dihydro-5,6-dimethyl-2-oxide, benzo[c]thiophene-1,3-dihydro-5-methanol-2-oxide, benzo[c]thiophene-1,3-dihydro-5-hydroxy-2-oxide, benzo[c]thiophene-1,3-dihydro-5-fluoro-2-oxide, benzo[c]thiophene-1,3-dihydro-5-chloro-2-oxide, benzo[c]thiophene-1,3-dihydro-5-bromo-2-oxide, benzo[c]thiophene-1,3-dihydro-5-ol-2-oxide, naphtho[2,3-c]thiophene-1,3-dihydro-2-oxide, and naphtho[2,3-c]thiophene-1,3-dihydro-4-phenyl-2-oxide, but not limited to the above.

The compound (A1) can be used alone or in combination of two or more thereof.

It is possible to use at least one of the compounds represented by formula (1-2) instead of the compound (A1).

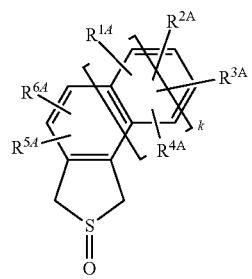

(1-2)

In the above-described formula (1-2), $R^{1A}$, $R^{2A}$, $R^{3A}$, $R^{4A}$, $R^{5A}$, $R^{6A}$ and k each have the same meaning as $R^1$, $R^2$, $R^3$, $R^4$, $R^5$, $R^6$ and k in the above-described formula (1).

$R^{5A}$ and $R^{6A}$ are preferably a hydrogen atom. With respect to $R^{1A}$, $R^{2A}$, $R^{3A}$, and $R^{4A}$, preferably at least two, more preferably three, most preferably all of the four are a hydrogen atom.

[Compound (B) Having Sulfo Group]

It is considered that Compound (B) having sulfo group has a dopant ability and a catalytic ability by allowing it to coexist with Compound (A1). The Compound (B) having sulfo group is not particularly limited as long as it is a compound having one or more sulfo groups in a molecule. Examples thereof include a low-molecular sulfonic acid and a sulfonic acid polymer having one or more sulfo groups in a molecule. A sulfonate compound can be used after an ion exchange processing.

Examples of a low-molecular sulfonic acid include sulfonic acid, alkyl sulfonic acid, benzene sulfonic acid, naphthalene sulfonic acid, anthraquinone sulfonic acid, camphor sulfonic acid, and a derivative thereof. These low-molecular sulfonic acid may be monosulfonic acid, disulfonic acid or trisulfonic acid. Examples of a derivative of alkyl sulfonic acid include 2-acrylamide-2-methylpropane sulfonic acid. Examples of a derivative of benzene sulfonic acid include phenol sulfonic acid, styrene sulfonic acid, toluene sulfonic acid, and dodecyl benzene sulfonic acid. Examples of a derivative of naphthalene sulfonic acid include 1-naphthalene sulfonic acid, 2-naphthalene sulfonic acid, 1,3-naphthalene disulfonic acid, 1,3,6-naphthalene trisulfonic acid, and 6-ethyl-1-naphthalene sulfonic acid. Examples of a derivative of anthraquinone sulfonic acid includes anthraquinone-1-sulfonic acid, anthraquinone-2-sulfonic acid, anthraquinone-2,6-disulfonic acid, and 2-methylanthraquinone-6-sulfonic acid. Among these, preferred are 1-naphthalene sulfonic acid, 2-naphthalene sulfonic acid, 1,3,6-naphthalene trisulfonic acid, anthraquinone sulfonic acid, anthraquinone disulfonic acid, p-toluene sulfonic acid and camphor sulfonic acid.

Examples of a polymer having one or more sulfo group in a molecule include polyvinyl sulfonic acid, polystyrene sulfonic acid, polyallyl sulfonic acid, polyacrylic acid ethyl sulfonic acid, polyacrylic acid butyl sulfonic acid, poly(2-acrylamido-2-methylpropane sulfonic acid), and polyisoprene sulfonic acid. These may be a homopolymer or a copolymer of two or more monomers. Among these, preferred are polystyrene sulfonic acid, polyisoprene sulfonic acid, polyacrylic acid ethyl sulfonic acid, and polyacrylic acid butyl sulfonic acid.

The molecular weight of the polymer having sulfo group is not particularly limited, but the weight average molecular weight is preferably 1,000,000 or less, more preferably 500,000 or less, and still more preferably 300,000 or less. When the weight average molecular weight is 1,000,000 or less, it can be easily handled due to good solubility of the polymer in the system.

A polymer having sulfo group can mitigate thermal decomposition of a conjugated conductive polymer, improve the dispersibility of a monomer to obtain a conjugated conductive polymer in a dispersion medium, and furthermore can function as a dopant of the conjugated conductive polymer.

These Compounds (B) having sulfo group may be used singly or in combination of two or more thereof.

In the above-described Method (i), a conductive polymer can be obtained by polymerizing at least one of the above-mentioned Compounds (A1) in the presence of the Compound (B) having sulfo group. The amount of the Compound (B) having sulfo group is preferably 1 to 400 moles, more preferably 5 to 300 moles, still more preferably 10 to 250 moles to 100 moles of the above-mentioned Compound (A1) in terms of sulfo group. If the amount of the Compound (B) is 1 to 400 moles to 100 moles of the above-mentioned Compound (A1) in terms of sulfo group, it is desirable from the viewpoint of the conversion and the reaction rate.

<Method (ii)>

A solid electrolytic capacitor can be manufactured by polymerizing at least one of the Compounds (A2) represented by formula (2) on the surface of valve-acting metal having fine pores without using an oxidizing agent to thereby form a solid electrolyte layer. It is possible to polymerize the Compound (A2) without the presence of the Compound (B) having sulfo group. It is considered due to the fact that not only that the Compound (A2) is a constituent unit of the conductive polymer but the compound itself has sulfo group which combines a dopant ability and a catalytic ability. In the Method (ii), the above-mentioned Compound (B) having sulfo group may be contained besides the above-mentioned Compound (A2).

[Compound (A2)]

The Compound (A2) is a compound represented by formula (2).

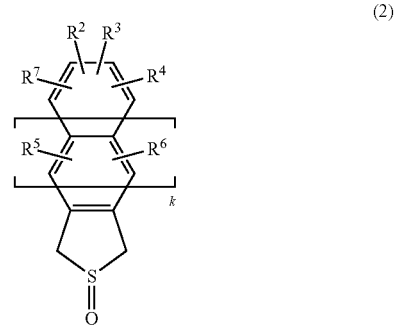

(2)

In the formula, $R^7$ is sulfo group. $R^2$, $R^3$, $R^4$, $R^5$, and $R^6$ independently represent a monovalent substituent selected from a group consisting of (1) a hydrogen atom, (2) linear or branched alkyl group having 1 to 20 carbon atoms, linear or branched alkoxy group having 1 to 20 carbon atoms, or linear or branched alkyl ester group (alkylcarbonyloxy group or alkoxycarbonyl group) having 1 to 20 carbon atoms, (3) $SO_2M$, (4) a halogen atom, (5) carboxy group, (6) phosphonyl group, (7) nitro group, (8) cyano group, (9) primary, secondary or tertiary amino group, (10) trihalomethyl group, (11) phenyl group, and (12) phenyl group substituted with at least one member selected from alkyl group, hydroxy group, alkoxy group, alkyl ester group, carbonyl group, sulfo group and a halogen atom, and (13) sulfo group. M represents OH; alkali metal alkoxide selected from $O^-Na^+$, $O^-Li^+$, and $O^-K^+$; ammonium alkoxide represented by $O^-NH_4^+$; linear or branched alkoxy group having 1 to 20 carbon atoms; or a halogen atom selected from chlorine, fluorine, bromine, and iodine.

Examples of useful substituents $R^2$, $R^3$, $R^4$, $R^5$, and $R^6$ include a hydrogen atom, a halogen atom, $SO_2M$, alkyl group, alkoxy group, alkyl ester group, nitro group and cyano group.

When these substituents are exemplified in more detail, examples of a halogen atom include fluorine, chlorine, bromine and iodine, and examples of hydrocarbon chains of alkyl group or alkyl ester group include methyl, ethyl, propyl, isopropyl, n-butyl, isobutyl, t-butyl, pentyl, hexyl, octyl, dodecyl, tetradecyl, cyclopentyl, and cyclohexyl. Examples of the alkoxy group include methoxy group, ethoxy group, (2-methoxy)ethoxy group, propoxy group, isopropoxy group, hexyloxy group, octyloxy group, and dodecyloxy group. Alkyl ester group is specifically alkylcarbonyloxy group and alkoxycarbonyloxy group, for example, such as malonate ester group (—OCOH$_2$CO$_2$H), fumarate ester group (—OCOCH═CHCO$_2$H; a double bond is trans-form), and maleate ester group (—OCOCH═CHCO$_2$H, a double bond is cis-form). In addition, examples include alkylcarbonyloxy group and alkoxycarbonyloxy group, in which alkyl group is methyl group, ethyl group, n-propyl group, isopropyl group, n-butyl group, isobutyl group, t-butyl group, pentyl group, hexyl group, octyl group, dodecyl group, tetradecyl group, cyclopentyl group, cyclohexyl group and the like.

Furthermore, examples of substituents other than those described above include amino group such as methyl amino group, ethyl amino group, diphenyl amino group and anilino group; trifluoromethyl group, chlorophenyl group, and acetamide group.

Hydrocarbon chains in the substituents represented by $R^2$, $R^3$, $R^4$, $R^5$, and $R^6$ are bound to one another at an arbitrary position and may form at least one bivalent chain that forms at least one three- to seven-membered ring structure of saturated or unsaturated hydrocarbon chain with the carbon atoms to which the substituent is bound. The alkyl group, alkoxy group, or alkyl ester group represented by $R^2$, $R^3$, $R^4$, $R^5$, and $R^6$, or a cyclic hydrocarbon chain constituted thereof may contain at least one bond selected from a carbonyl bond, an ether bond, an ester bond, an amide bond, a sulfide bond, a sulfinyl bond, sulphonyl bond, and an imino bond.

Examples of three- to seven-membered ring structures of saturated or unsaturated hydrocarbon formed by hydrocarbon chains of $R^2$, $R^3$, $R^4$, $R^5$, or $R^6$ in formula (2) bound to one another at an arbitrary position include the structures represented by the following formulae (6) to (8).

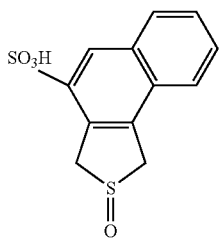

(6)

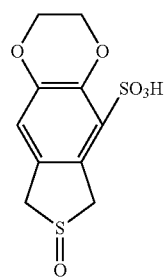

(7)

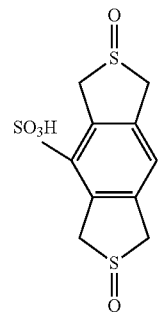

(8)

Other than the compound (A2), at least one compound selected from the group of compounds represented by formula (2-2) may be used.

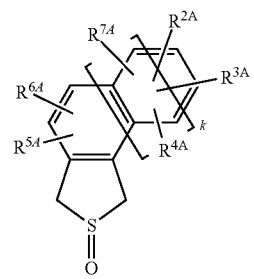

(2-2)

In formula (2-2), $R^{7A}$ is sulfo group. $R^{2A}$, $R^{3A}$, $R^{4A}$, $R^{5A}$, $R^{6A}$ and k in formula (2-2) have the same meanings as $R^2$, $R^3$, $R^4$, $R^5$, $R^6$ and k in formula (2).

$R^{5A}$ and $R^{6A}$ are preferably a hydrogen atom. With respect to $R^{2A}$, $R^{3A}$, and $R^{4A}$, preferably at least two, more preferably all of the three are a hydrogen atom.

k represents the number of condensed rings surrounded by a benzene ring having substituents of $R^2$ to $R^4$, which is an integer from 0 to 3. k is preferably 0 from the viewpoint of solubility in a solvent.

Examples of the basic skeletons excluding the substituents $R^2$ to $R^7$ of the compounds represented by formula (2) includes 1,3-dihydoroisothianaphthene-S-oxide (a compound in which k is 0).

As a compound represented by formula (2), at least one member selected from benzo[c]thiophene-1,3-dihydro-2-oxide-4-sulfonic acid, benzo[c]thiophene-1,3-dihydro-2-oxide-5-sulfonic acid, benzo[c]thiophene-1,3-dihydro-2-oxide-5,6-disulfonic acid, benzo[c]thiophene-1,3-dihydro-2-oxide-4,5-disulfonic acid, benzo[c]thiophene-1,3-dihydro-2-oxide-4,6-disulfonic acid, and benzo[c]thiophene-1,3-dihydro-2-oxide-4,7-disulfonic acid.

$R^5$ and $R^6$ are preferably a hydrogen atom. With respect to $R^2$, $R^3$, and $R^4$, preferably at least one, more preferably at least two, particularly preferably all of the three are a hydrogen atom.

Specifically, examples include benzo[c]thiophene-1,3-dihydro-2-oxide-5-sulfonic acid, and benzo[c]thiophene-1,3-dihydro-2-oxide-5,6-disulfonic acid.

The compound (A2) may be used singly or in combination of two or more thereof.

<Method (iii)>

A solid electrolytic capacitor can be manufactured by copolymerizing at least one of the Compounds (A1) and at least one of the Compounds (A2) on the surface of valve-acting metal having fine pores without using an oxidizing agent to thereby form a solid electrolyte layer. In the Method (iii), the above-mentioned Compound (B) having sulfo group may be contained besides the above-mentioned Compound (A2).

The ratio of the Compound (A2) is preferably 1 to 400 moles, more preferably 5 to 300 moles, still more preferably 10 to 250 moles to 100 moles of the above-mentioned Compound (A1). If the ratio of the Compound (B) is 1 to 400 moles to 100 moles of the above-mentioned Compound (A1), it is desirable from the viewpoint of the conversion and the reaction rate.

By copolymerizing the compound (A1) and the compound (A2) at an arbitrary ratio, it is possible to easily adjust the solvent affinity, the solubility, and other such aspects of performance according to the purpose.

For example, when copolymerization of benzo[c]thiophene-1,3-dihydro-2-oxido as the compound (A1) and benzo[c]thiophene-1,3-dihydro-2-oxido-5-sulfonic acid as the compound (A2) is conducted, the two compounds have a different degree of water-solubility and therefore, as the ratio of benzo[c]thiophene-1,3-dihydro-2-oxido increases, the generated conductive polymer has a lower water-solubility and becomes insolubilized.

Also, as the ratio of benzo[c]thiophene-1,3-dihydro-2-oxido increases, the crystallized region in a polyisothianaphthene skeleton enlarges and the conductivity tends to be improved.

The matters set forth below are common to the methods (i) to (iii).

[Solvent C]

In the polymerization in the present invention, it is desirable to use a solvent from the viewpoint of substance diffusion. A solvent to be used is not particularly limited as long as a monomer to be used dissolves in the solvent. Examples of the solvent include water, methanol, ethanol, isopropanol, toluene, butanol, acetic acid, acetic anhydride, dimethylformamide, dimethyl sulfoxide, γ-butyrolactone, propylene carbonate, sulfolane, N-methylpyrrolidone, dimethylsulfolane, butandiol, ethylene glycol, diethylene glycol, glycerol (glycerin), diglycerol (diglycerin), and polyethylene glycol.

From the viewpoint of ease in handling industrially, preferred are water, methanol, ethanol, isopropanol, dimethylformamide, ethylene glycol, and dimethyl sulfoxide. More preferred are water, ethanol, isopropanol, ethylene glycol and dimethyl sulfoxide.

In the case where the reaction is developed while evaporating water generated in the polymerization reaction as described below, it is desirable to use as a part or a whole of the solvent a solvent having a boiling point higher than water.

The solvent having a higher boiling point than water is preferably a solvent having a boiling point of 105° C. or higher. Specific examples include toluene (boiling point: 111° C.), butanol (boiling point: 118° C.), acetic anhydride (boiling point: 140° C.), dimethylformamide (boiling point: 153° C.), dimethylsulfoxide (boiling point: 189° C.), γ-butyrolactone (boiling point: 203° C.), propylene carbonate (boiling point: 240° C.), sulfolane (boiling point: 285° C.), N-methylpyrrolidone (boiling point: 202° C.), butanediol (boiling point: 230° C.), ethylene glycol (boiling point: 198° C.), diethylene glycol (boiling point: 244° C.), glycerol (glycerin, boiling point: 290° C.), diglycerol (diglycerin, boiling point 265° C. (15 mmHg)), and polyethylene glycol. Although some kinds of polyethylene glycol such as polyethylene glycol 400, polyethylene glycol 600 and polyethylene glycol 1500 (the number after "polyethylene glycol" represents the molecular weight) have no boiling point under ordinary pressure, polyethylene glycols that are volatilized under reduced pressure are to be included in solvents having a boiling point higher than water. When the boiling point is indicated, the boiling point with no annotation of the pressure provided in parentheses means a boiling point under ordinary pressure. Among these solvents having a higher boiling point than water, preferred is ethylene glycol or dimethylsulfoxide, which is miscible with water and does not form an azeotropic composition with water, from viewpoints of ease in handling and drying, and the acid resistance.

It is presumed that by using a solvent having a higher boiling point as a part or a whole of the solvent, the substance diffusion is not to be prevented when water generated by the polymerization reaction evaporates, and thus the conversion is improved.

The ratio of the solvent (C) in the reaction system is preferably 5 to 99 mass %, more preferably 30 to 95 mass %. When the ratio of the solvent (C) in the reaction system is 5 to 99 mass %, a good conversion and a good reaction rate can be obtained.

The solid content concentration of the solution differs depending on the composition but the solution after polymerization has a solid content of preferably 0.01 to 60 mass %, more preferably 0.1 to 50 mass %, still more preferably 1 to 30 mass %. When the solution concentration is set to be within the above-mentioned range, it is possible to perform polymerization at an appropriate reaction rate and to produce the conductive polymer stably and economically in a short time, and the storage stability of the solution is improved.

As described below, in the case where the monomer solution, the dopant, and the catalytic solution are separated and mixed at the time of polymerization to be used, the upper limit of the concentration of each solution is not limited thereto and each solution can be used at a concentration of between 0.01 to 100 mass %.

The solvent having a higher boiling point than water is preferably 0.1 to 99.5 mass %, more preferably 1 to 80 mass %, still more preferably 5 to 70 mass % to the total of the solvent (C). When the ratio of the solvent (C) in the reaction system is 0.1 to 99.5 mass %, it makes it possible to produce a reaction with high productivity.

With respect to the conductivity improver to be added at the time of polymerization, it is desirable to use the one that can be dehydrated using Dean-Stark apparatus and the like. These solvents can be used singly or in combination of two or more thereof.

[Compound (D) that is Copolymerizable with Compound (A1) or Compound (A2)]

In the methods (i) to (iii), Compound (D) that is copolymerizable with Compounds (A1) and (A2) can be copolymerized with Compounds (A1) and/or (A2). In the method (i), the Compound (A1) and the Compound (D) can be copolymerized in the presence of the Compound (B) having sulfo group. In the method (ii), the Compound (A2) and the Compound (D) can be copolymerized. In the method (iii), the Compounds (A1) and (A2) and the Compound (D) can be copolymerized.

Examples of the Compound (D) include aromatic compounds such as isothianaphthene, isobenzofuran, isobenzoindoline, isobenzoselenaphene, isobenzoterenaphene, thiophene, pyrrole, furan, selenophene, tellurophene, aniline, benzene, naphto[2,3-c]thiophene, anthra[2,3-c]thiophene, naphthaceno[2,3-c]thiophene, pentaceno[2,3-c]thiophene, perylo[2,3-c]thiphene, acenaphtho[2,3-c]thiophene; a compound capable of forming a Π-conjugated structure at the time of copolymerization such as 1,3-dihydroisothianaphthene, 1,3-dihydronaphtho[2,3-c]thiophene, 1,3-dihydroanthra[2,3-c]thiophene, 1,3-dihydronaphthaceno[2,3-c]thiophene, 1,3-dihydropentaceno[2,3-c]thiophene, 1,3-dihydropentaceno[2,3-c]thiophene, 1,3-dihydroperylo[2,3-c]thiophene, and 1,3-dihydroacenaphto[2,3-c]thiophene; a compound containing nitrogen in a condensed ring such as thieno[c]pyridine, thieno[c]pyrazine, thieno[c]pyridazine, thieno[c]quinoxaline, 1,3-dihydrothieno[c]pyridine, 1,3-dihydrothieno[c]pyrazine, 1,3-dihydrothieno[c]pyridazine and 1,3-dihydrothieno[c]quinoxaline; and a derivative having various substituents thereof, for example, (2) linear or branched alkyl group having 1 to 20 carbon atoms, linear or branched alkoxy group having 1 to 20 carbon atoms, or linear or branched alkyl ester group (alkylcarbonyloxy group or alkoxycarbonyl group) having 1 to 20 carbon atoms, (3) $SO_2M$, (4) a halogen atom, (5) carboxy group, (6) phosphonyl group, (7) nitro group, (8) cyano group, (9) primary, secondary or tertiary amino group, (10) trihalomethyl group, (11) phenyl group, and (12) phenyl group substituted with at least one member selected from alkyl group, hydroxy group, alkoxy group, alkyl ester group, carbonyl group, sulfo group and halogen. Here, preferred substituents include the same as those described in the substituents $R^2$, $R^3$, $R^4$, $R^5$, and $R^6$.

Examples thereof include 1,3-dihydroisothianaphthene, 4-methyl-1,3-dihydroisothianaphthene, 5-methyl-1,3-dihydroisothianaphthene, 4,5-dimethyl-1,3-dihydroisothianaphthene, 5,6-dimethyl-1,3-dihydroisothianaphthene, 4,7-dimethyl-1,3-dihydroisothianaphthene, 5-fluoro-1,3-dihydroisothianaphthene, 5-chloro-1,3-dihydroisothianaphthene5-bromo-1,3-dihydroisothianaphthene, 5-hydroxy-1,3-dihydroisothianaphthene, 5-carboxy-1,3-dihydroisothianaphthene, pyrrole, 3-methylpyrrole, 3,4-dimethylpyrrole, 3-fluoropyrrole, 3-chloropyrrole, 3-bromopyrrole, N-methylpyrrole, 3-hydroxypyrrole, 3-carboxypyrrole, isoindole, 4-methylisoindole, 5-methylisoindole, 4,5-dimethylisoindole, 5,6-dimethylisoindole, 4,7-dimethylisoindole, 5-fluoroisoindole, 5-chloroisoindole, 5-bromoisoindole, 5-hydroxyisoindole, 5-carboxyisoindole, 2,3-dihydroisoindole, 4-methyl-2,3-dihydroisoindole, 4,5-dimethyl-2,3-dihydroisoindole, 4,7-dimethyl-2,3-dihydroisoindole, 5-fluoro-2,3-dihydroisoindole, 5-chloro-2,3-dihydroisoindole, 5-bromo-2,3-dihydroisoindole, 5-hydroxy-2,3-dihydroisoindole, 5-carboxy-2,3-dihydroisoindolefuran, 3-methylfuran, 3,4-dimethylfuran, 3-fluorofuran, 3-chlorofuran, 3-bromofuran, isobenzofuran, 4-methylisobenzofuran, 5-methylisobenzofuran, 4,5-dimethylisobenzofuran, 5,6-dimethylisobenzofuran, 4,7-dimethylisobenzofuran, 5-fluoroisobenzofuran, 5-hydroxyisobenzofuran, 5-carboxyisobenzofuran, 1,3-dihydrobenzo[c]selenophene, 4-methyl-1,3-dihydrobenzo[c]selenophene, 5-methyl-1,3-dihydrobenzo[c]selenophene, 4,5-dimethyl-1,3-dihydrobenzo[c]selenophene, 5,6-dimethyl-1,3-dihydrobenzo[c]selenophene, 4,7-dimethyl-1,3-dihydrobenzo[c]selenophene, 5-fluoro-1,3-dihydrobenzo[c]selenophene, 5-chloro-1,3-dihydrobenzo[c]selenophene, 5-bromo-1,3-dihydrobenzo[c]selenophene, 5-hydroxy-1,3-dihydrobenzo[c]selenophene, 5-carboxy-1,3-dihydrobenzo[c]selenophene, 1,3-dihydrobenzo[c]selenophene-2-oxide, 4-methyl-1,3-dihydrobenzo[c]selenophene-2-oxide, 5-methyl-1,3-dihydrobenzo[c]selenophene-2-oxide, 4,5-dimethyl-1,3-dihydrobenzo[c]selenophene-2-oxide, 5,6-dimethyl-1,3-dihydrobenzo[c]selenophene-2-oxide, 4,7-dimethyl-1,3-dihydrobenzo[c]selenophene-2-oxide, 5-fluoro-1,3-dihydrobenzo[c]selenophene-2-oxide, 5-chloro-1,3-dihydrobenzo[c]selenophene-2-oxide, 5-bromo-1,3-dihydrobenzo[c]selenophene-2-oxide, 5-hydroxy-1,3-dihydrobenzo[c]selenophene-2-oxide, 5-carboxy-1,3-dihydrobenzo[c]selenophene-2-oxide, benzo[c]selenophene, 4-methyl-benzo[c]selenophene, 5-methyl-benzo[c]selenophene, 4,5-dimethyl-benzo[c]selenophene, 5,6-dimethyl-benzo[c]selenophene, 4,7-dimethyl-benzo[c]selenophene, 5-fluoro-benzo[c]selenophene, 5-chloro-benzo[c]selenophene, 5-bromo-benzo[c]selenophene, 5-hydroxy-benzo[c]selenophene, and 5-carboxy-benzo[c]selenophene, It is preferable to use the Compound (D) that is copolymerizable with the Compounds (A1) and (A2) in an amount of preferably 200 mol % or less, more preferably 100 mol % or less, still more preferably 50 mol % or less to the total of the mole number of the Compound (A1) and the Compound (A2). If the ratio of the Compound (D) is 200 mol % or less, the conversion and the reaction rate are appropriate.

[Additives]

Within a scope which does not affect the effects of the present invention, additives having other functions may be added at the time of reaction. For example, additives such as a surfactant, a thickener, a thixotropic agent, a rheology modifier and the like may be added to impart functionality such as a coating property, an impregnating property, and permeability. A binder and the like may be added to improve the binding property and heat resistance at the time of forming a film. A component having a function to reduce stress at the time of forming a film may be used.

These additives may have a substituent. Examples include dodecylbenzenesulfonic acid, polyvinyl alcohol, poly(N-vinylacetamide), polyacrylamide, and polyacrylic acid. The additives may be used singly or in combination of two or more thereof.

In the polymerization step of a conductive polymer for forming a solid electrolyte layer in the conventional technology, an oxidizing agent is generally used but an oxidizing agent is not used in the polymerization step of a conductive polymer of the present invention. Here, examples of the oxidizing agent used in the conventional technology include a metal-based oxidizing agent such as ferric chloride, ferric sulfate, ferric nitrate, ferric ethylenediamine tetraacetate, copper chloride, cuprous chloride, copper ethylenediamine tetraacetate, and aluminum chloride; halogens such as iodine and bromine; quinones such as 2,3-dichloro-5,6-dicyano-1,4-benzoquinone, tetrachloro-1,2-benzoquinone, tetrachloro-1,4-benzoquinone, and tetracyano-1,4-benzoquinone; inorganic oxidizing agents such as sulfuric acid, fuming sulfuric acid, sulfur trioxide, chlorosulfuric acid, fluorosulfuric acid, amidosulfuric acid, persulfuric acid, ammonium persulfate, sodium persulfate, and hydrogen peroxide.

These oxidizing agents decrease the conductivity of the solid electrolyte layer when they remain as impurities after the polymerization reaction. When a metal-based oxidizing agent remains, it has an adverse effect that causes damage to a dielectric coating film and increase in leakage current. Therefore, when these oxidizing agents are used, a purification step is required to remove them after the reaction.

In the present invention, the polymerization is performed in the presence of the Compound (B) having sulfo group having a catalytic ability, or a compound (A) having a substituent having a catalytic ability (sulfo group) is polymerized and therefore the purification process after the reaction, which process is required in the case of using an oxidizing agent, can be skipped.

In the present invention, use of impurity components other than the above-mentioned oxidizing agents is not limited within a scope which does not affect the capacitor characteristics.

[Polymerization Conditions]

The temperature at the time of polymerization in the methods as described above is not particularly limited and preferably 10 to 300° C., more preferably 20 to 180° C., still more preferably 60 to 180° C. When the temperature at the time of polymerization is 10 to 300° C., the reaction rate, the conversion and the viscosity are appropriate and the side reaction can be suppressed. As a result, the conductive polymer can be manufactured stably and in an industrially appropriate time period. In addition, the conductivity of the obtained conductive polymer tends to be increased. From the viewpoint of capacitor characteristics, the temperature is preferable in reducing the leakage current. In heating treatment at the time of polymerization, a known hot plate, heater, an air-conditioner, oven or hot-air dryer can be used. As needed, the polymerization may be performed while changing the temperature within the above-described range. The atmosphere to perform heating treatment is not particularly limited but air atmosphere is preferable. The pressure at the time of heating treatment is not particularly limited but atmospheric pressure is preferable. The heating treatment may be performed under reduced pressure to be expedited. In the case of evaporating a solvent, the solvent may be evaporated at the polymerization temperature or lower. After evaporating the solvent under reduced pressure or by dry airflow, the temperature may be raised to the polymerization temperature.

Depending on the type of the anode body, the above-described steps: i.e. the step of attaching the polymerization reaction solution on the dielectric film and the step of forming a solid electrolyte layer may repeated twice or more, respectively. In this case, heating treatment may be performed each time the reaction solution is attached to remove a part or the entire of the dispersion medium or the reaction solution may be attached multiple times in a row and heat treatment may be performed at the end to remove the solvent.

There is no particular limit on the atmosphere in the above-described polymerization. The polymerization may be performed in the air, or under an inert gas atmosphere such as nitrogen and argon. The reaction pressure is not particularly limited, but normal pressure is preferred.

The reaction time is not particularly limited. Although the time cannot be uniformly defined since it varies depending on the chemical structure of the compounds, the reaction temperature, the reaction pressure and the like, it is preferably 5 seconds to 5 hours, more preferably 30 seconds to 2 hours, still more preferably 1 minute to 1 hour. It is desirable to perform the heating treatment within the above-described time range from the viewpoints of sufficient volatilization of the solvent, reaction efficiency in the porous anode body, suppression of side reaction, and reduction of leakage current.

The pH at the time of reaction is preferably 1 to 7, more preferably 1 to 5, still more preferably 1 to 3. When the pH is 1 or more, the load on the substrate is low. When the pH is 7 or less, the conversion and the reaction rate are appropriate.

In the above-described methods (i) to (iii), there is no particular limit on the order or the method of addition of the compound selected from the above-described Compound (A1), the Compound (A2) and the Compound (B) having sulfo group; and the solvent (C), the Compound (D) copolymerizable with the Compounds (A1) and (A2), and the additives as an optional component, to the reaction system. For example, it is possible to perform polymerization by impregnating the dielectric layer of the porous anode body with each of the compounds in order or applying each of compounds to the dielectric layer in order.

In the production method of the conductive polymer of the present invention, it is desirable to develop reaction while removing by-products from the reaction system. The by-products can be removed by a volatility (distillation) method, an adsorption method, and the other separation methods. Specifically, in the polymerization of the compound (A) and the compound (B), water is generated as a by-product. When the reaction proceeds while removing the water by distillation, the polymerization rate increases and the conversion is improved. From the viewpoint of retaining the reaction system uniformly, it is preferable to use a solvent having a higher boiling point.

If the purification is performed after the formation of a solid electrolyte layer, the solid electrolyte layer may be washed by impregnating it with an arbitrary solvent. However, an oxidizing agent (Fe(III)-based compound and the like) is not used in the polymerization step of a conductive polymer for forming a solid electrolyte layer in the present invention and therefore high capacitor characteristics can be obtained without performing the purification process.

[Method for Storing the Reaction Solution Prior to Polymerization]

The storage temperature of the above-mentioned reaction solution prior to polymerization is not particularly limited. The temperature is generally −30 to 50° C., preferably −20 to 40° C., more preferably −10 to 30° C. When the storage temperature of the solution is set to be within the above-mentioned range, it is possible to slow the rate of polymerization that proceeds due to the effect of strong acid. The storage atmosphere is not particularly limited, and it may be the air, or an inert gas atmosphere such as nitrogen and argon.

In the case where the monomer solution, the dopant, and the catalytic solution are separated and mixed at the time of polymerization to be used, the temperature range is not limited thereto and the solution can be stored stably in a broader temperature range.

The solid electrolyte layer in the present invention may be formed by combining the method of the present invention and a conventional method for forming a solid electrolyte layer. That is, after forming a part of the solid electrolyte layer on the porous anode body having a dielectric film on its surface by the method of the present invention, a solid electrolyte layer may be formed by a method of impregnating the anode body with a conductive polymer dispersion (for example, a water dispersion of poly(3,4-ethylenedioxythiophene)/poly(styrenesulfonate)) or a electropolymerization method. Contrary to the above-described way, after forming a part of the solid electrolyte layer by a conventional method, a solid electrolyte layer may be formed by the method of the present invention.

The method of forming a solid electrolyte layer of the present invention can also be used for manufacturing a hybrid electrolytic capacitor using a solid electrolyte of a conductive polymer and an electrolytic solution in combination as an electrolyte.

[Formation of a Conductor Layer]

It is preferable to form a conductor layer on the solid electrolyte layer formed as described above to obtain good electrical contact with a cathode lead. Examples of the conductor layer include a carbon paste layer, a silver paste layer, a metallic plating layer, a metal-deposited layer, and a conductive resin film.

[Manufacturing of a Capacitor Element]

A cathode lead is electrically connected to the above-described conductor layer and a part of the cathode lead is exposed outside the outer jacket of the capacitor to serve as a cathode external terminal. On the other hand, an anode lead is electrically connected to the anode body through an anode lead wire and a part of the anode lead is exposed outside the outer jacket of the capacitor to serve as an anode external terminal. A common lead frame can be used to fix the cathode lead and the anode lead. Next, an outer jacket is formed by sealing with resin and the like to thereby obtain a capacitor.

EXAMPLES

Hereinafter, the present invention is described in more detail by way of examples as below. It should be noted that the present invention is not limited thereto.

Example 1: Formation of a Porous Anode Body Having a Dielectric Film on its Surface A porous anode body having a dielectric film on its surface to be used for a solid electrolytic capacitor of the present invention was manufactured according to the method disclosed in JP 2011-77257 A. That is, a porous anode body in which a dielectric film having diniobium pentoxide was formed on the surface of the anode body was manufactured using a niobium powder for a capacitor.

The porous anode body had an electrostatic capacity of 37.9 µF in 40% sulfuric acid according to the method described in EIAJ standard RC2361A (revised in February 2000).

[Preparation of Polymerization Reaction Solution]

2.5 g of benzo[c]thiophene-1,3-dihydro-2-oxide (to be abbreviated as "Oxide") was dissolved in 74.2 g of ethanol and 1.56 g of p-toluenesulfonic acid hydrate (to be abbreviated as "TSA") was added thereto to obtain a polymerization reaction solution (to be abbreviated as "Oxide/TSA 2/1'"; "2/1" represents the molar ratio. Terms are abbreviated in a similar way in the following description).

[Formation of Solid Electrolyte Layer]

After immersing the porous anode body obtained by the above-described method in a polymerization reaction solution (Oxide/TSA 2/1) for 10 seconds in the air at room temperature (25° C.), it was dried with a 150° C. hot-air dryer. The immersing operation was repeated three times. Subsequently, re-chemical conversion was performed in an aqueous phosphoric acid (0.1 mass %) solution at a temperature of 80° C. and a voltage of 20 V. Next, a carbon paste was applied on the anode body having a solid electrolyte layer formed thereon so as not to be in contact with the anode lead wire and dried. Furthermore, a silver paste was applied to provide a contact point of the cathode and dried.

The electrostatic capacity (µF) at 120 Hz of the obtained solid electrolytic capacitor was measured by using an LCR meter (Agilent Technologies Japan, Ltd.; 4284A). The measurement results are shown in Table 1.

Example 2

3.2 g of benzo[c]thiophene-1,3-dihydro-2-oxide was dissolved in 74.5 g of ethanol and 0.80 g of p-toluenesulfonic acid hydrate was added thereto to obtain a polymerization reaction solution (to be abbreviated as "Oxide/TSA 5/1"). A capacitor was manufactured in the same way as in Example 1 except for preparation of the above-described solution and the electrostatic capacity thereof was measured. The measurement results are shown in Table 1.

Comparative Example 1

2.5 g of dihydroisothianaphthene (DHITN) was dissolved in 77.4 g of ethanol and 1.75 g of p-toluenesulfonic acid hydrate (TSA) was added thereto to obtain a polymerization reaction solution (to be abbreviated as "DHITN/TSA 2/1"). A capacitor was manufactured in the same way as in Example 1 except for preparation of the above-described solution and the electrostatic capacity thereof was measured. The measurement results are shown in Table 1.

Comparative Example 2

3.2 g of dihydroisothianaphthene (DHITN) was dissolved in 74.5 g of ethanol and 0.89 g of p-toluenesulfonic acid hydrate (TSA) was added thereto to obtain a polymerization reaction solution (to be abbreviated as "DHITN/TSA 5/1"). A capacitor was manufactured in the same way as in Example 1 except for preparation of the above-described solution and the electrostatic capacity thereof was measured. The measurement results are shown in Table 1.

Example 3

A capacitor was manufactured in the same way as in Example 1 except that the number of the immersing operations was set to 10 times and the electrostatic capacity thereof was measured. The measurement results are shown in Table 1.

Example 4

A capacitor was manufactured in the same way as in Example 2 except that the number of the immersing operations was set to 10 times and the electrostatic capacity thereof was measured. The measurement results are shown in Table 1.

Comparative Example 3

A capacitor was manufactured in the same way as in Comparative Example 1 except that the number of the immersing operations was set to 10 times and the electrostatic capacity thereof was measured. The measurement results are shown in Table 1.

Comparative Example 4

A capacitor was manufactured in the same way as in Comparative Example 2 except that the number of the immersing operations was set to 10 times and the electrostatic capacity thereof was measured. The measurement results are shown in Table 1.

TABLE 1

Capacitor characteristics

| | Polymerization reaction solution | Number of immersing operations | Capacity (120 Hz) [µF] |
|---|---|---|---|
| Example 1 | Oxide/TSA 2/1 | 3 | 3.16 |
| | | | 2.62 |
| | | | 3.12 |
| Example 2 | Oxide/TSA 5/1 | 3 | 13.91 |
| | | | 14.61 |
| | | | 14.79 |
| Comparative Example 1 | DHITN/TSA 2/1 | 3 | 0.07 |
| | | | 0.06 |
| | | | 0.07 |
| Comparative Example 2 | DHITN/TSA 5/1 | 3 | 0.28 |
| | | | 0.50 |
| | | | 0.25 |
| Example 3 | Oxide/TSA 2/1 | 10 | 9.91 |
| | | | 9.58 |
| | | | 9.64 |
| Example 4 | Oxide/TSA 5/1 | 10 | 31.37 |
| | | | 31.24 |
| | | | 30.83 |
| Comparative Example 3 | DHITN/TSA 2/1 | 10 | 0.58 |
| | | | 0.59 |
| | | | 0.67 |
| Comparative Example 4 | DHITN/TSA 5/1 | 10 | 1.88 |
| | | | 1.73 |
| | | | 1.76 |

By making comparison between Example 1 and Comparative Example 1, between Example 2 and Comparative Example 2, between Example 3 and Comparative Example 3, and between Example 4 and Comparative Example 4 in Table 1 respectively, it can be seen that a larger capacity can be obtained by forming a solid electrolyte layer by means of homopolymerization using benzo[c]thiophene-1,3-dihydro-2-oxide of the present invention compared to the case of using dihydroisothianaphthene.

Example 5: Production of Aqueous Solution for Preparing Polymerization Reaction Solution After 35.9 g of sodium benzo[c]thiophene-1,3-dihydro-2-oxide-5-sulfonate was added to and dissolved in 266 g of ion exchanged water, the resultant solution was allowed to pass through a column filled with cation-exchange resin (H type) to perform sodium and hydrogen ion exchange reaction. The resultant was used as an aqueous solution of benzo[c]thiophene-1,3-dihydro-2-oxide-5-sulfonic acid. Also, 17.3 g of sodium benzo[c]thiophene-1,3-dihydro-2-oxide was added to and dissolved in 133 g of ion exchanged water and used as an aqueous solution of benzo[c]thiophene-1,3-dihydro-2-oxide.

22 g of the aqueous solution of benzo[c]thiophene-1,3-dihydro-2-oxide-5-sulfonic acid (to be abbreviated as "SH-Oxide") and 5 g of the aqueous solution of benzo[c]thiophene-1,3-dihydro-2-oxide, which were prepared as described above, and 27 g of ethylene glycol were mixed to obtain a polymerization reaction solution (to be abbreviated as "SH-Oxide/Oxide 7/3").

[Formation of Solid Electrolyte Layer]

After immersing the porous anode body obtained by the above-described method in a polymerization reaction solution (SH-Oxide/Oxide 7/3) for 10 seconds in the air at 25° C., it was dried with a 120° C. hot-air dryer. The immersing operation was repeated 10 times. Subsequently, re-chemical conversion was performed in an aqueous phosphoric acid (0.1 mass %) solution at a temperature of 20° C. and a voltage of 20 V. Next, a carbon paste was applied on the porous anode body so as not to be in contact with the anode lead wire and dried. Furthermore, a silver paste was applied to provide a contact point of the cathode and dried.

The electrostatic capacity (µF) at 120 Hz and equivalent series resistance [ESR](Ω) of the obtained solid electrolytic capacitor were measured by using the above-mentioned LCR meter. The measurement results are shown in Table 2.

Example 6

19 g of the aqueous solution of benzo[c]thiophene-1,3-dihydro-2-oxide-5-sulfonic acid and 10 g of the aqueous solution of benzo[c]thiophene-1,3-dihydro-2-oxide were mixed to prepare a polymerization reaction solution (to be abbreviated as "SH-Oxide/Oxide 5/5"). Except for that, a capacitor was manufactured in the same way as in Example 5 to measure the electric characteristics. The measurement results are shown in Table 2.

Example 7

8.0 g of the aqueous solution of benzo[c]thiophene-1,3-dihydro-2-oxide-5-sulfonic acid and 10 g of the aqueous solution of benzo[c]thiophene-1,3-dihydro-2-oxide were mixed to prepare a polymerization reaction solution (to be abbreviated as "SH-Oxide/Oxide 3/7"). Except for that, a capacitor was manufactured in the same way as in Example 5 to measure the electric characteristics. The measurement results are shown in Table 2.

Comparative Example 5

A capacitor was manufactured in the same way as in Example 5 except that the polymerization reaction solution was changed to a commercial poly(3,4-ethylenedioxythiophene)/poly(styrenesulfonate) dispersion (PEDOT/PSS dispersion) to measure the electric characteristics. The measurement results are shown in Table 2.

TABLE 2

Capacitor characteristics 2

| | Polymerization reaction solution | Number of immersing operations | Capacity (120 Hz) [µF] | ESR (100 kHz) [Ω] |
|---|---|---|---|---|
| Example 5 | SH-Oxide/Oxide 7/3 | 10 | 23.5 | 0.50 |
| | | | 23.9 | 0.59 |
| | | | 21.0 | 0.68 |
| Example 6 | SH-Oxide/Oxide 5/5 | 10 | 22.4 | 1.01 |
| | | | 21.2 | 1.24 |
| | | | 19.9 | 1.44 |
| Example 7 | SH-Oxide/Oxide 3/7 | 10 | 19.2 | 2.79 |
| | | | 19.3 | 2.74 |
| | | | 18.9 | 2.82 |
| Comparative Example 5 | PEDOT/PSS dispersion | 10 | 13.8 | 1.69 |
| | | | 13.8 | 1.22 |
| | | | 11.6 | 1.13 |

It can be seen from Table 2 that a higher capacity can be obtained in Examples 5 to 7, in which a solid electrolyte is formed by copolymerization of benzo[c]thiophene-1,3-dihydro-2-oxide-5-sulfonic acid and benzo[c]thiophene-1,3-dihydro-2-oxide of the present invention compared to Comparative Example 5 using a PEDOT/PSS dispersion. Particularly, in Example 5, an extremely low ESR value can be attained.

The invention claimed is:

1. A method of producing a solid electrolytic capacitor, comprising a step of preparing valve-acting metal having fine pores, a step of forming a dielectric film on the surface of the valve-acting metal, a step of attaching a polymerization reaction solution containing monomers of a conductive polymer on the dielectric film, and a step of polymerizing the monomers of the conductive polymer to thereby form a solid electrolyte layer containing the conductive polymer on the dielectric film; wherein the solid electrolyte layer containing the conductive polymer is formed on the dielectric film by polymerizing at least one compound (A2) represented by the following formula (2) without using an oxidizing agent:

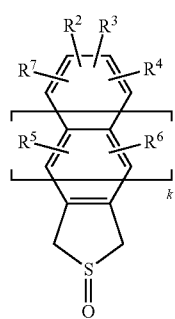

(2)

in the formula, $R^7$ is sulfo group; $R^2$, $R^3$, $R^4$, $R^5$, and $R^6$ independently represent a monovalent substituent selected from a group consisting of (1) a hydrogen atom, (2) linear or branched alkyl group having 1 to 20 carbon atoms, linear or branched alkoxy group having 1 to 20 carbon atoms, or linear or branched alkyl ester group (alkylcarbonyloxy group or alkoxycarbonyl group) having 1 to 20 carbon atoms, (3) $SO_2M$, (4) a halogen atom, (5) carboxy group, (6) phosphonyl group, (7) nitro group, (8) cyano group, (9) primary, secondary or tertiary amino group, (10) trihalomethyl group, (11) phenyl group, (12) phenyl group substituted with at least one member selected from alkyl group, hydroxy group, alkoxy group, alkyl ester group, carbonyl group, sulfo group and a halogen atom (13) hydrocarbon chains which are bound to one another at an arbitrary position and which form at least one bivalent chain that forms at least one three- to seven-membered ring structure of saturated or unsaturated hydrocarbon chain with the carbon atoms to which the substituent is bound, and (14) an alkyl group, alkoxy group, or alkyl ester group, or a cyclic hydrocarbon chain constituted thereof containing at least one bond selected from a carbonyl bond, an ether bond, an ester bond, an amide bond, a sulfide bond, a sulfinyl bond, sulphonyl bond, and an imino bond; M represents OH, alkali metal alkoxide selected from $O^-Na^+$, $O^-Li^+$, and $O^-K^+$; or ammonium alkoxide represented by $O^-NH_4^+$, linear or branched alkoxy group having 1 to 20 carbon atoms, or a halogen atom selected from chlorine, fluorine, bromine, and iodine; and k represents the number of condensed rings surrounded by a hetero ring and a benzene ring having substituents of $R^2$ to $R^4$, which is an integer from 0 to 3.

2. The method of producing the solid electrolytic capacitor according to claim 1, wherein the compound (A2) is a compound in which k in the formula (2) is 0.

3. The method of producing the solid electrolytic capacitor according to claim 2, wherein the polymerization is performed while removing water generated by the polymerization.

4. The method of producing the solid electrolytic capacitor according to claim 1, wherein the compound (A2) is a compound in which $R^2$, $R^3$, $R^4$, $R^5$, and $R^6$ in the formula (2) independently is a monovalent substituent selected from (1) a hydrogen atom, (2) linear or branched alkyl group having 1 to 20 carbon atoms, linear or branched alkoxy group having 1 to 20 carbon atoms, or linear or branched alkyl ester group having 1 to 20 carbon atoms, and (3) a halogen atom.

5. The method of producing a solid electrolytic capacitor according to claim 1, wherein the solid electrolyte layer containing the conductive polymer is formed on the dielectric film by copolymerizing the at least one compound (A2) represented by the formula (2) with a compound (D), which can be copolymerized with the compound (A2), without using an oxidizing agent.

6. The method of producing a solid electrolytic capacitor according to claim 1, wherein the polymerization is performed while removing water generated by the polymerization.

7. The method of producing a solid electrolytic capacitor according to claim 1, wherein the polymerization is performed in a solvent and a part or a whole of the solvent is a solvent having a boiling point higher than water.

8. A method of producing a solid electrolytic capacitor, comprising a step of preparing valve-acting metal having fine pores, a step of forming a dielectric film on the surface of the valve-acting metal, a step of attaching a polymerization reaction solution containing monomers of a conductive polymer on the dielectric film, and a step of polymerizing the monomers of the conductive polymer to thereby form a solid electrolyte layer containing the conductive polymer on the dielectric film; wherein the solid electrolyte layer containing the conductive polymer is formed on the dielectric film by copolymerizing at least one of compounds (A1) represented by the following formula (1) and at least one of compounds (A2) represented by the following formula (2) without using an oxidizing agent:

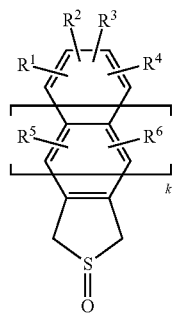

(1)

in the formula, $R^1$, $R^2$, $R^3$, $R^4$, $R^5$, and $R^6$ independently represent a monovalent substituent selected from a group consisting of (1) a hydrogen atom, (2) linear or branched alkyl group having 1 to 20 carbon atoms, linear or branched alkoxy group having 1 to 20 carbon atoms, or linear or branched alkyl ester group (alkylcarbonyloxy group or alkoxycarbonyl group) having 1 to 20 carbon atoms, (3) $SO_2M$, (4) a halogen atom, (5) carboxy group, (6) phosphonyl group, (7) nitro group, (8) cyano group, (9) primary, secondary or tertiary amino group, (10) trihalomethyl group, (11) phenyl group, (12) phenyl group substituted with at least one member selected from alkyl group, hydroxy group, alkoxy group, alkyl ester group, carbonyl group and a halogen atom, (13) hydrocarbon chains which are bound to one another at an arbitrary position and which form at least one bivalent chain that forms at least one three- to seven-membered ring structure of saturated or unsaturated hydrocarbon chain with the carbon atoms to which the substituent is bound, and (14) an alkyl group, alkoxy group, or alkyl ester group, or a cyclic hydrocarbon chain constituted thereof containing at least one bond selected from a carbonyl bond, an ether bond, an ester bond, an amide bond, a sulfide bond, a sulfinyl bond, sulphonyl bond, and an imino bond; M represents OH, alkali metal alkoxide selected from $O^-Na^+$, $O^-Li^+$, and $O^-K^+$, or ammonium alkoxide represented by $O^-NH_4^+$, linear or branched alkoxy group having 1 to 20 carbon atoms, or a halogen atom selected from chlorine, fluorine, bromine, and iodine, and k represents the number of condensed rings surrounded by a hetero ring and a benzene ring having substituents of $R^1$ to $R^4$, which is an integer from 0 to 3;

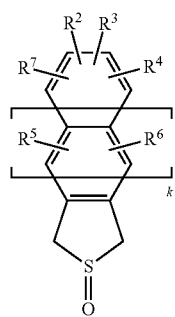

(2)

in the formula, $R^7$ is sulfo group; $R^2$, $R^3$, $R^4$, $R^5$, and $R^6$ independently represent a monovalent substituent selected from a group consisting of (1) a hydrogen atom, (2) linear or branched alkyl group having 1 to 20 carbon atoms, linear or branched alkoxy group having 1 to 20 carbon atoms, or linear or branched alkyl ester group (alkylcarbonyloxy group or alkoxycarbonyl group) having 1 to 20 carbon atoms, (3) $SO_2M$, (4) a halogen atom, (5) carboxy group, (6) phosphonyl group, (7) nitro group, (8) cyano group, (9) primary, secondary or tertiary amino group, (10) trihalomethyl group, (11) phenyl group, and (12) phenyl group substituted with at least one member selected from alkyl group, hydroxy group, alkoxy group, alkyl ester group, carbonyl group, sulfo group and a halogen atom; hydrocarbon chains in the substituent represented by $R^2$, $R^3$, $R^4$, $R^5$, and $R^6$ are bound to one another at an arbitrary position and may form at least one bivalent chain that forms at least one three- to seven-membered ring structure of saturated or unsaturated hydrocarbon chain with the carbon atoms to which the substituent is bound; the alkyl group, alkoxy group, or alkyl ester group represented by $R^2$, $R^3$, $R^4$, $R^5$, and $R^6$, or a cyclic hydrocarbon chain constituted thereof may additionally contain at least one bond selected from a carbonyl bond, an ether bond, an ester bond, an amide bond, a sulfide bond, a sulfinyl bond, sulphonyl bond, and an imino bond; M represents OH; OH, alkali metal alkoxide selected from $O^-Na^+$, $O^-Li^+$, and $O^-K^+$, or ammonium alkoxide represented by $O^-NH_4^+$, linear or branched alkoxy group having 1 to 20 carbon atoms; atoms, or a halogen atom selected from chlorine, fluorine, bromine, and iodine; and k represents the number of condensed rings surrounded by a hetero ring and a benzene ring having substituents of $R^2$ to $R^4$, which is an integer from 0 to 3.

9. The method of producing a solid electrolytic capacitor according to claim 8, wherein the solid electrolyte layer containing the conductive polymer is formed on the dielectric film by copolymerizing at least one of the compounds (A1) represented by the formula (1), at least one of the compounds (A2) represented by the formula (2), and a compound (D), which can be copolymerized with the compound (A1) and the compound (A2).

10. The method of producing a solid electrolytic capacitor according to claim 8, wherein the polymerization is performed in a solvent and a part or a whole of the solvent is a solvent having a boiling point higher than water.

* * * * *